United States Patent
Lawlis et al.

(10) Patent No.: US 10,630,481 B2
(45) Date of Patent: Apr. 21, 2020

(54) CONTROLLER AREA NETWORK MESSAGE AUTHENTICATION

(71) Applicant: Ford Global Technologies, LLC, Dearborn, MI (US)

(72) Inventors: James Martin Lawlis, Grosse Pointe Farms, MI (US); Douglas A. Oliver, Redford, MI (US); Xin Ye, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 631 days.

(21) Appl. No.: 15/345,295

(22) Filed: Nov. 7, 2016

(65) Prior Publication Data

US 2018/0131522 A1  May 10, 2018

(51) Int. Cl.
*H04L 9/32* (2006.01)
*H04L 29/06* (2006.01)
*H04L 9/06* (2006.01)

(52) U.S. Cl.
CPC .......... *H04L 9/3242* (2013.01); *H04L 9/0631* (2013.01); *H04L 63/0428* (2013.01); *H04L 63/08* (2013.01); *H04L 63/123* (2013.01); *H04L 2209/84* (2013.01)

(58) Field of Classification Search
CPC . H04L 9/3242; H04L 9/0631; H04L 63/0428; H04L 63/08; H04L 63/123
See application file for complete search history.

(56) References Cited

U.S. PATENT DOCUMENTS

| 7,660,934 B2 | 2/2010 | Robert et al. |
| 9,288,048 B2 | 3/2016 | Suk et al. |
| 2010/0250053 A1 | 9/2010 | Grill et al. |
| 2010/0268949 A1* | 10/2010 | Schuetze ............ H04L 9/002 713/168 |
| 2011/0093639 A1 | 4/2011 | Patrick |

(Continued)

FOREIGN PATENT DOCUMENTS

| EP | 3264718 A1 | 1/2018 |
| KR | 101263086 B1 | 5/2013 |

(Continued)

OTHER PUBLICATIONS

Lei A: A Lightweight Authentication Protocol for CAN—Andrea Ina Radu and Flavio D. Garcia—School of Computer Science, University of Birmingham, UKI.

(Continued)

*Primary Examiner* — David Le
(74) *Attorney, Agent, or Firm* — Frank Lollo; Eversheds Sutherland (US) LLP

(57) ABSTRACT

Method and apparatus are disclosed for controller area network message authentication. An example disclosed vehicle includes a data bus and a first control unit communicatively coupled to the data bus. The example first control unit generates a secured message by (a) calculating a message authentication code, (b) truncating the message authentication code, (c) truncating a freshness value used to generate the message authentication code, and (d) placing portions of the truncated message authentication code and the truncated freshness value in separate portions of the secured message.

18 Claims, 6 Drawing Sheets

(56) References Cited

U.S. PATENT DOCUMENTS

| | | | | |
|---|---|---|---|---|
| 2012/0303973 | A1* | 11/2012 | Newsome | H04L 9/12 |
| | | | | 713/189 |
| 2015/0089236 | A1* | 3/2015 | Han | H04L 9/3242 |
| | | | | 713/181 |
| 2015/0270968 | A1 | 9/2015 | Nairn et al. | |
| 2016/0029213 | A1* | 1/2016 | Rajadurai | H04W 12/04 |
| | | | | 380/283 |
| 2016/0205194 | A1 | 7/2016 | Takeshi et al. | |
| 2017/0302454 | A1* | 10/2017 | Jacquin | G06F 21/79 |
| 2018/0007076 | A1* | 1/2018 | Galula | G06F 21/85 |

FOREIGN PATENT DOCUMENTS

| | | |
|---|---|---|
| WO | WO 2002/025866 A2 | 3/2002 |
| WO | WO 2016/068942 A1 | 5/2016 |

OTHER PUBLICATIONS

Search Report dated Mar. 13, 2018 for GB Patent Application No. 1718151.2 (5 pages).

\* cited by examiner ated code by calculating a message authentication code based on a freshness value and the payload, and then truncating the message authentication code.

CONTROLLER AREA NETWORK MESSAGE AUTHENTICATION

TECHNICAL FIELD

The present disclosure generally relates to vehicle electronic control units and, more specifically, controller area network message authentication.

BACKGROUND

Vehicles include various sensors and electronic control units (ECUs) that monitor and control subsystems of the vehicle. For example, a body control module controls door locks, windows, mirrors, lights, and horn of the vehicle. The ECUs communicate and exchange information via a vehicle data bus. The information may include status data, sensor readings, diagnostic codes, and requests to perform actions or enter diagnostic modes. However, malicious actors may install unauthorized devices on the vehicle data bus (e.g., via the on-board diagnostic port (OBD-II)) to monitor and control the subsystems of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for controller area network message authentication. An example disclosed vehicle includes a data bus and a first control unit communicatively coupled to the data bus. The example first control unit generates a secured message by (a) calculating a message authentication code, (b) truncating the message authentication code, (c) truncating a freshness value used to generate the message authentication code, and (d) placing portions of the truncated message authentication code and the truncated freshness value in separate portions of the secured message.

An example method to communicate via a controller area network bus of a vehicle includes calculating a message authentication code. The example method also includes truncating the message authentication code and truncating a freshness value used to generate the message authentication code. Additionally, the method includes placing portions of the truncated message authentication code and the truncated freshness value in separate portions of a secured message.

An example method to communicate via a controller area network bus of a vehicle includes calculating a message authentication code. The example method also includes truncating a freshness value used to generate the message authentication code. Additionally, the example method includes placing (a) the truncated freshness value and a first portion of the message authentication code into an arbitration space of a secure message and (b) a payload and a second portion of the message authentication code into a data space of the secured message. The example method includes transmitting the secured message.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
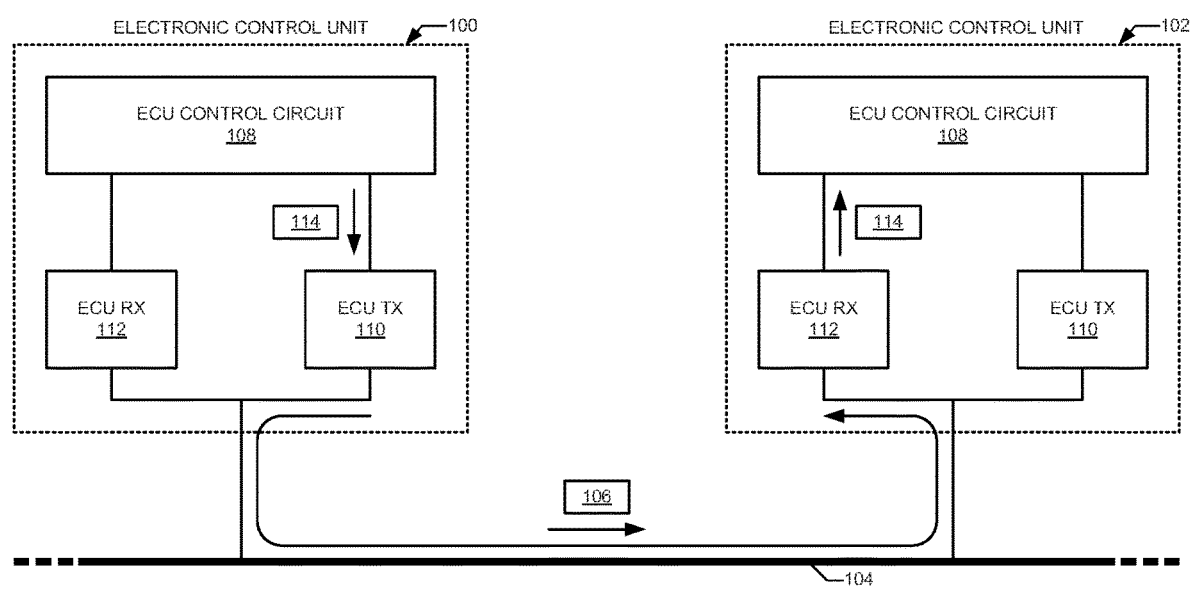
FIG. 1 illustrates electronic control units (ECUs) communicating via a controller area network (CAN) bus in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles include data buses to exchange information, such as diagnostic information, sensor readings, and/or action requests, etc. The vehicle may include multiple data buses that may operate at different frequencies and/or may segregate different parts of the vehicle. In the examples illustrated below, the vehicles include a controller area network (CAN) bus and/or a CAN flexible data (CAN-FD) bus. The CAN bus protocol is defined by International Standards Organization (ISO) 11898-1. The CAN-FD bus protocol is defined by ISO 11898-7. However, the protocols do not provide a method for electronic control units (ECUs) exchanging information on the data buses to authenticate a source of a message. In such a manner, an unauthorized device connected to the data bus (e.g., via the ODB-II port) may spoof an authorized device to mislead the ECUs on the data bus and issue commands to the ECUs. For example, the unauthorized device may request that the body control module unlock the doors of the vehicle.

A CAN message includes control bits, an arbitration space, and a data space. The arbitration space, when an extended identifier (ID) field control bit is set, has a length of 29-bits. Currently, the IDs for the ECUs (e.g., the ECU CAN IDs) are 11-bits long. Traditionally, the arbitration space includes a CAN ID field with an ECU CAN ID value which identifies the ECU that is the source of the message. The data space includes a payload field that has a length of 64-bits (8-bytes) to include the information (sometime referred to as "the payload" or "the signal") to be communicated to the other ECUs. Thus, the length of the payload may be between 0-bits and 64-bits long. As disclosed below, the ECUs include a transmission (TX) module and a receiver (RX) module that include cryptography engines. The transmission module generates a truncated message authentication code (MAC) that based on an encryption of a freshness value (e.g., a salt value) and the information to be communication using an encryption key agreed upon by the authorized ECUs connected to the data bus. The transmission module also truncates the freshness value. In some examples, the truncated MAC and the truncated freshness value together are referred to as the "security data." The transmission module places the ECU CAN ID into the CAN ID field and the payload into the payload field. The transmission module places a first portion of the security data into the remaining bits of the arbitration space (e.g., 18-bits) and a second portion of the security data into the remaining bits of the payload field in the data space.

Upon receiving the CAN message, the receiver module retrieves the security data with the truncated freshness value and the truncated MAC, and the payload. Based on a stored freshness value (e.g., an older/out-of-date freshness value) stored in memory and the truncated freshness value, the receiver module predicts the full freshness value used by the transmission module. The receiver module generates a verification MAC based on the predicted full freshness value, the payload, and the encryption key. The receiver module compares the truncated MAC to the verification MAC. If a portion of the verification MAC matches the truncated MAC, the receiver module determines that the source of the message is authorized to communicate via the vehicle data bus. Otherwise, if a portion of the verification MAC does not match the truncated MAC, the receiver module determines that the source of the message is not authorized to communicate via the vehicle data bus and ignores the message.

FIG. 1 illustrates electronic control units (ECUs) 100 and 102 communicating via a controller area network (CAN) bus 104 in accordance with the teachings of this disclosure. The ECUs 100 and 102 monitor and control the subsystems of a vehicle (not shown). The illustrated example, for simplicity, includes two ECUs 100 and 102. However, the vehicle may, for example include seventy or more of the ECUs 100 and 102. As illustrated in more detail below in FIG. 4, the ECUs 100 and 102 are discrete sets of electronics that include their own circuit(s) (such as integrated circuits, microprocessors, memory, storage, etc.) and firmware, sensors, actuators, and/or mounting hardware.

The vehicle data bus 104 is implemented as a controller area network (CAN) bus or a CAN flexible data (CAN-FD) bus as modified herein. The vehicle data bus 104 communicatively couples the ECUs 100 and 102. In the illustrated example, one of the ECUs 100 (sometimes referred to as the transmitting ECU) transmits a secured message 106 on the vehicle data bus 104, and the other one of the ECUs 102 (sometimes referred to as the receiving ECU) receives the secured message 106 from the vehicle data bus 104. However, either of the illustrated ECUs 100 and 102 may transmit secured message 106 at times and received secured message 106 at times. The vehicle data bus 104 communicatively couples the ECUs 100 and 102.

In the illustrated example, the ECUs 100 and 102 include an example ECU control circuit 108, an example ECU transmitter 110, and an example ECU receiver 112. In the illustrated example, the ECU transmitter 110 and the ECU receiver 112 are separate. In some examples, the ECU transmitter 110 and the ECU receiver 112 are combined into one module.

The ECU control circuit 108 monitors and controls components in the vehicle. The ECU control circuit 108 includes circuits to, for example, drive relays, drive brushed direct current (DC) motors, drive stepper motors, drive actuator, drive solenoids, drive LEDs, and/or control switch and solid state relays, etc. Additionally, ECU control circuit 108 may include circuits to communicate with analog and/or digital sensors, such as wheel speed sensors, temperature sensors, ambient light sensors, etc. For example, the ECU control circuit 108 of an engine control unit may interface with a pedal position sensor, a throttle valve position sensor, an oil temperature sensor, an oil pressure sensor, an oxygen sensor, a fuel level sensor, fuel injectors, a wheel speed sensor, a starter motor, an air flow sensor, a coolant temperature sensor, and/or spark plugs, etc. The ECU control circuit 108 produces various types of payload data 114. The payload data 114 may include information such as diagnostic codes, sensor readings, and/or requests for other ECUs 100 and 102 to perform an action, etc. Additionally, the ECU control circuit 108 may use the payload data 114 transmitted by other ECUs 100 and 102 in its control algorithms. For example, the ECU control circuit 108 of a body control module may control the windows based on data from the wheel speed sensor monitored by the engine control unit.

As disclosed in more detail in FIG. 2 below, the ECU transmitter 110 generates security data to be used by the ECU receiver module(s) 112 of the other ECU(s) 102 to determine whether the transmitting ECU 100 is authorized to communicate via the vehicle data bus 104. The ECU transmitter 110 includes the security data in the secured message 106 so that the length and position of the secured message 106 (e.g., the control bits, the CAN ID field, the payload field, etc.) defined by the CAN and/or CAN-FD protocols are not changed. The security data is based on a freshness value, the payload to be sent in the message, and an encryption key (e.g., the encryption key 212 of FIGS. 2 and 3 below).

As disclosed in more detail in FIG. 3 below, when the ECU receiver 112 identifies a secured message 106 on the vehicle data bus 104 that the corresponding ECU control circuit 108 may use (e.g., based on the purported ECU CAN ID in the CAN ID field of the secured message 106), the ECU receiver 112 determines whether the security data in the secured message 106 is indicative of the secured message 106 being sent by an ECU 100 that is authorized to communicate via the vehicle data bus 104. If the secured message 106 is from an authorized ECU 100, the ECU receiver 112 forwards the payload data 114 to the corresponding ECU control circuit 108. Otherwise, the ECU receiver 112 ignores the message. Determining whether to forward the message is based on the security data in the message, an old freshness value, the payload data, and the encryption key.

Figure 2:
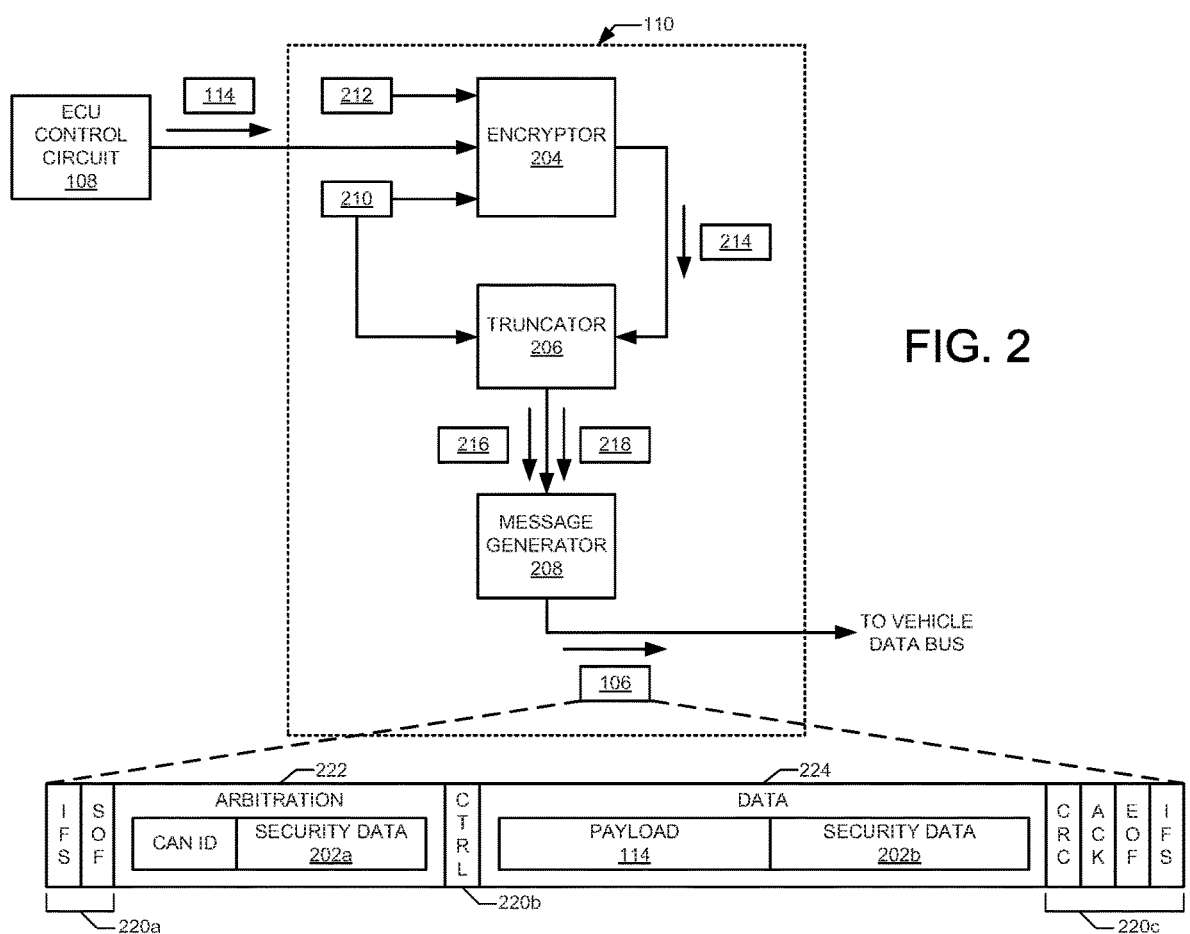
FIG. 2 illustrates a block diagram of an ECU transmitter of the ECUs of FIG. 1.

FIG. 2 illustrates a block diagram of an ECU transmitter 110 of the ECUs 100 and 102 of FIG. 1. The ECU transmitter 110 generates security data 202a and 202b used to verify that the ECU 100 and 102 is authorized to communicate via the vehicle data bus 104. The security data 202a and 202b is split into parts to be distributed in an extended arbitration space and the data space of the secured message 106. In such a manner, because the portion of the security data 202b in the data space may be smaller, the payload data 114 can be larger while the secure message 106 delivers the security data 202a and 202b and the payload 114 in one CAN frame. In the illustrated example, the ECU transmitter 110 includes an example encryptor 204, an example truncator 206 and an example message generator 208.

The encryptor 204 generates a MAC value based on the payload data 114 from the ECU control circuit 108, a freshness value 210, and encryption key 212. The freshness value 210 is a value stored in memory (e.g., the memory 406 of FIG. 4 below) that changes from time to time. In some examples, the freshness value 210 is a counter that increments when the ECU transmitter 110 transmits a secured message 106. Alternatively, in some examples, the freshness value 210 maybe based on a global timer (e.g. a value broadcast from time-to-time by one of the ECUs 100 and 102), a course timer value (e.g., an 16-bit counter than rolls over every 24-hours the vehicle is powered on, etc.), a trip counter, etc. In some examples, the freshness value 210 is reset and/or resynchronized when the vehicle power cycles. In some examples, the freshness value 210 has a length of 48-bits (6-bytes).

The encryptor 204 implement an encryption algorithm based on the encryption key 212. In some examples, the ECUs 100 and 102 of the vehicle are assigned the encryption key 212 when the vehicle is manufactured. The encryption algorithm may be any suitable encryption algorithm, such as Advanced Encryption Standard (AES). In some examples, the encryption algorithm is a one-way encryption algorithm. Using the encryption algorithm, the encryptor 204 encrypts the payload data 114 and the freshness value 210 using the encryption key 212. Using the result, the encryptor 204 generates a MAC 214. The encryptor 204 generates the MAC 214 based on the Cipher-based Message Authentication Code (CMAC) algorithm as defined by the National Institute of Standards and Technology (NIST) Special Publication (SP) 800-38B, the Galois Message Authentication Code (GMAC) algorithm as defined by NIST SP 800-38D, or the keyed-hash message authentication code (HMAC) algorithm as defined by Federal Information Processing Standard (FIPS) 198-1, all of which are hereby incorporated by reference herein.

The truncator 206 truncates the freshness value 210 to generate a truncated freshness value 216, and truncates the MAC 214 to generate a truncated MAC 218. To truncate the freshness value 210 and the MAC 214, the truncator 206 discards a portion of the bits of the values. In some examples, the truncator 206 discards the most significant bits (MSB) of the freshness value 210 and the MAC 214. The amount the freshness value 210 and the MAC 214 are truncated is based on the length (in bits) of the payload data. The MAC 214 is truncated to the N-bit long truncated MAC 218, wherein N is selected based on security concerns. A longer truncated MAC 218 is more secure. For example, the truncator 206 may generate the truncated MAC 218 with the N least significant bits of the MAC 214. The length of the truncated freshness value 216 is determined in accordance with Equation (1) below.

$$F = 82 - X - N \qquad \text{Equation (1)}$$

In Equation (1) above, F is the length (in bits) of the truncated freshness value 216, X is the length (in bits) of the payload data 114, and N is the length (in bits) of the truncated MAC 218. Additionally, the space available in the secured message 106 for the payload data 114, the truncated MAC 218, and the truncated freshness value 216 is 82 (e.g., the 29-bit arbitration field plus the 64-bit data field minus the 11-bit ECU CAN ID). For example, if the length (X) of the payload data 114 is 40-bits, the length (N) of the truncated MAC 218 is 32-bits, then the length (F) of the truncated freshness value 216 may be 10-bits. In such a manner, the length (F) of the truncated freshness value 216 may vary depending on the length of the payload data 114 to be included in the secured message 106. In some examples, the value of N and F are based on the ECU CAN ID of the transmitting ECU 100. In such examples, the ECU transmitter 110 includes a table in memory that associates values of N and F with ECU CAN IDs. For example, ECUs 100 and 102 that are considered more critical (e.g., the engine control unit, the transmission control unit, the body control unit, etc.) may use a higher N-value (e.g., the MAC 214 is truncated less). In some examples, the length (F) of the truncated freshness value 216 is associated with the frequency at which the transmitting ECU 100 transmits secured message 106. For example, more frequent messages 106 means that the length (F) of the truncated freshness value 216 may be shorter.

The message generator 208 generates the secured message 106 with the ECU CAN ID for the corresponding ECU 100, the payload data 114, the truncated freshness value 216, and the truncated MAC 218. The example secured message 106 includes (i) header bits 220a (e.g., interframe space (IFS) bits, the start of frame (SOF) bit),(ii) an extended arbitration space 222, (iii) control bits (CTRL) 220b that specify the length of the CAN ID field and the length of the payload data 114, (iv) a data space 224, and (v) footer bits 220c (e.g., the cyclic redundancy check (CRC) bits, the node acknowledge bit (ACK), the end of frame (EOF) bits, and the interframe space (IFS) bits, etc.). The message generator 208 combines the truncated freshness value 216 and the truncated MAC 218 into the security data 202a and 202b. In some examples, the truncated MAC 218 is the first N-bits of the security data 202a and 202b. The message generator 208 places the ECU CAN ID and a first portion of the security data 202a into the extended arbitration space 222. Additionally, the message generator 208 places the payload data 114 and a second portion of the security data 202b into the data space 224. The message generator 208 then transmits the secured message 106 on the vehicle data bus 104.

Figure 3:
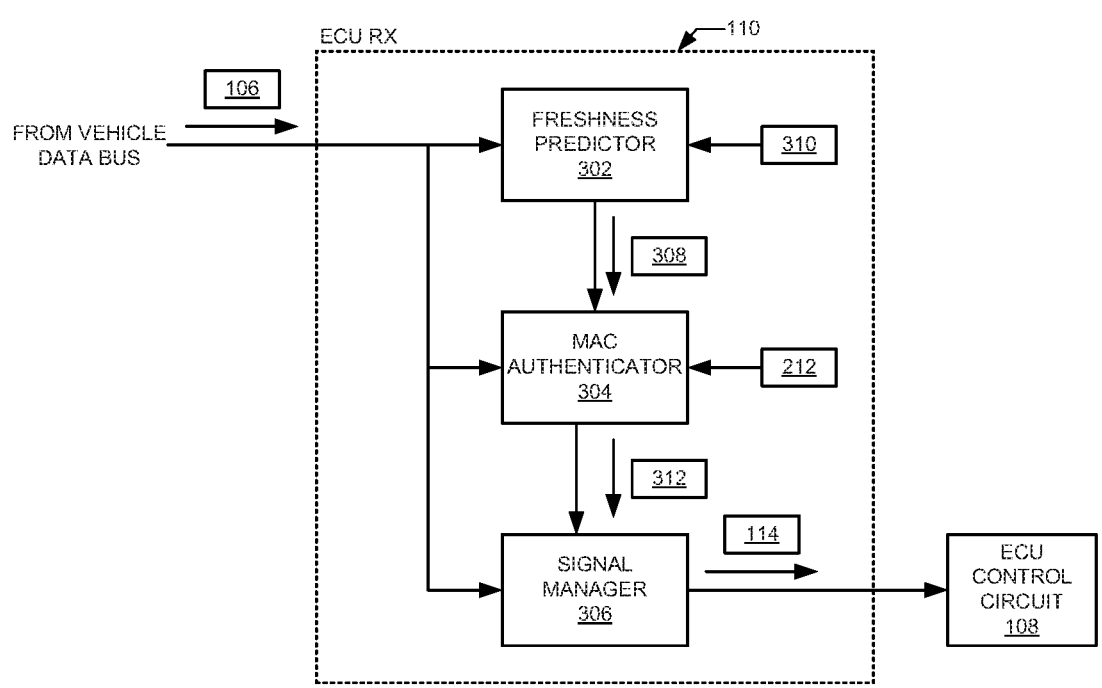
FIG. 3 illustrates a block diagram of an ECU receiver of the ECUs of FIG. 1.

FIG. 3 illustrates a block diagram of the ECU receiver 112 of the ECUs 100 and 102 of FIG. 1. The ECU receiver 112 determines whether the secured message 106 transmitted via the vehicle data bus 104 (a) was sent by the ECUs 100 and 102 authorized to communicate on the vehicle data bus 104, (b) was modified by an unauthorized or malicious entity or a compromised ECU, and (c) is an valid, but out of date, secured message 106 being used in a replay attach, etc. In the illustrated example, the ECU receiver 112 includes a freshness predictor 302, a MAC authenticator 304, and a payload manager 306.

The freshness predictor 302 generates a predicted freshness value 308 based on the truncated freshness value 216 in the security data 202a and 202b of the secured message 106 and a freshness value 310 of the receiving ECU 102. The freshness predictor 302 attempts to determine the predicted freshness value 308 so that the predicted freshness value 308 is equal to the untruncated freshness value 210 of the transmitting ECU 100. In some examples, the freshness predictor 302 the next possible value of a freshness value based on the freshness value 310 of the receiving ECU 102 and the truncated freshness value 216. Example predicted freshness values 308 are shown on Table (1) below (in hexadecimal).

TABLE (1)

| Example Receiving ECU Freshness Value (48-bits) | Example Truncated Freshness Value (16-bits) | Example Predicted Freshness Value (48-bits) |
| --- | --- | --- |
| 0x 0B F1 7B 33 75 0D | 0x 75 1E | 0x 0B F1 7B 33 75 1E |
| 0x B7 F9 13 72 F4 5C | 0x F5 5D | 0x B7 F9 13 72 F5 5D |
| 0x 28 6E 27 2B F9 2D | 0x 0E 51 | 0x 28 6E 27 2C 0E 51 |
| 0x 06 10 27 A7 63 95 | 0x 69 47 | 0x 06 10 27 A7 69 47 |

The MAC authenticator 304 generates a predicted MAC based on the predicted freshness value 308, the payload data 114 included in the secured message 106, and the encryption key 212. Initially, the MAC authenticator 304 generates an encryption value with the predicted freshness value 308 and the payload data 114 using the same encryption algorithm as the ECU transmitter 110. Then the MAC authenticator 304 generates the predicted MAC using the encryption value using the same MAC algorithm (e.g., CMAC, GMAC, HMAC, etc.) as the ECU transmitter 110. The MAC authenticator 304 compares N-bits of the predicted MAC to the truncated MAC 218 included in the secured message 106. For example, if the truncated MAC 218 is the N least significant bits of the MAC 214, the MAC authenticator 304 compares the N least significant bits of the predicted MAC to the truncated MAC 218. If the N least significant bits of the predicted MAC match the truncated MAC 218, the MAC authenticator 304 determines that the secured message 106 is authentic and sends an authentication signal 312 to the payload manager 306.

The payload manager 306 determines whether the payload data 114 and/or other parts of the message (e.g., the ECU CAN ID, etc.) are forwarded to the ECU control circuit 108. In the illustrated example, the payload manager 306 forwards the payload data 114 to the ECU control circuit 108 in response to receiving the authentication signal 312 from the MAC authenticator 304.

Figure 4:
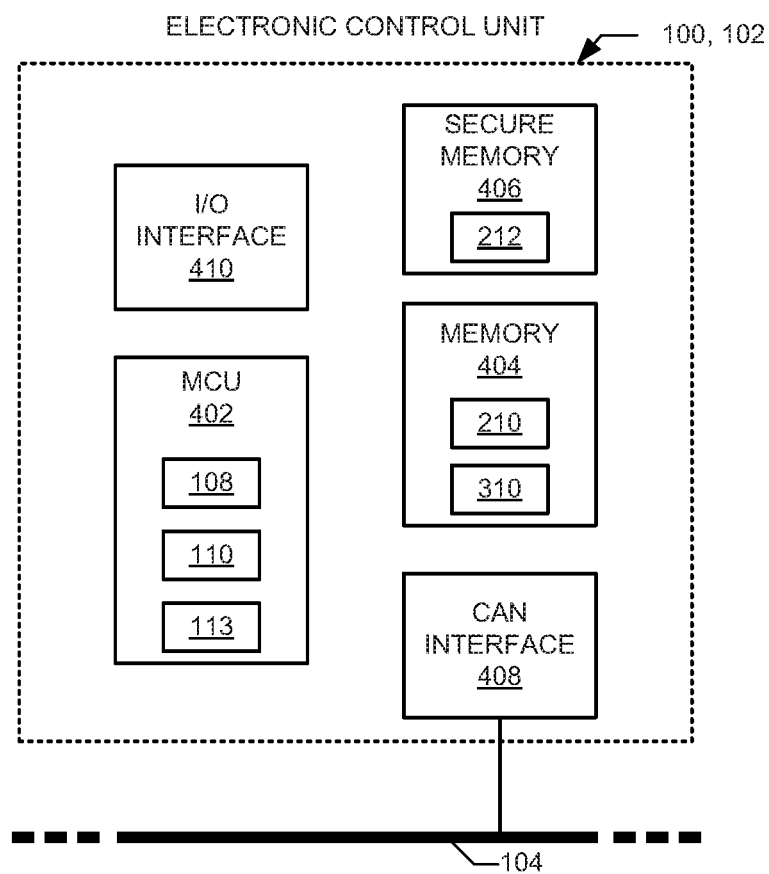
FIG. 4 is a block diagram of electronic components of the ECUs of FIG. 1.

FIG. 4 is a block diagram of electronic components 400 of the ECUs 100 and 102 of FIG. 1. In the illustrated example, the electronic components 400 includes a processor or controller 402, memory 404, secure memory 406, a CAN interface 408, and an input/output (I/O) interface 410.

The processor or controller 402 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). In the illustrated example, the processor or controller 402 is structured to include the ECU control circuit 108, the ECU transmitter 110, and the ECU receiver 112. The memory 404 and 406 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 404 and 406 includes multiple kinds of memory, particularly volatile memory and non-volatile memory. In the illustrated example, the freshness values 210 and 310 are stored in the memory 404. The secure memory 406 includes an embedded hardware encryption engine with its own authentication keys to securely store information. The cryptographic algorithm of the hardware encryption engine encrypts data stored in the secure memory 406. In the illustrated example, the encryption key 212 is stored in the secure memory 406.

The memory 404 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 404, the computer readable medium, and/or within the processor 402 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The CAN interface 408 facilitates communicating via the vehicle data bus 104. The CAN interface 408 provides an interface between the processor 402 and the vehicle data bus 104. In the illustrated example, the CAN interface 408 is communicatively coupled to the processor 402 via a communication protocol (e.g., RS-232, I$^2$C, SPI, etc.). Alternatively, in some examples, the CAN interface 408 is incorporated into the processor or controller 402. The CAN interface 408 is electrically coupled to the low level CAN bus input/output line and the high level CAN bus input/output line. The I/O interface 410 is a circuit that may include analog and/or digital components to communication with sensors and control actuators, and/or solenoids, relays, etc. to control the subsystems of the vehicle. For example, the I/O interface 410 of the body control module may include circuits to drive relays (e.g., to control wiper fluid, etc.), drive brushed direct current (DC) motors (e.g., to control power seats, power locks, power windows, wipers, etc.), drive stepper motors, and/or drive LEDs, etc.

Figure 5:
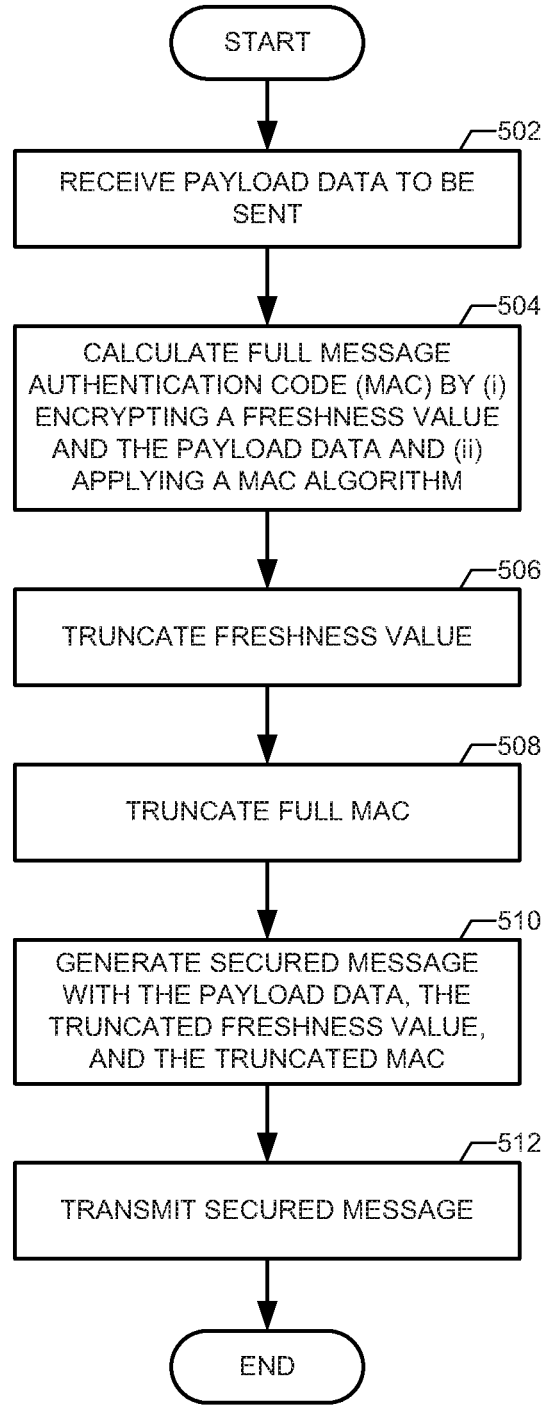
FIG. 5 is a flowchart of a method to encode messages via the ECU transmitter of FIGS. 1 and 2, which may be implemented by the electronic components of FIG. 4.

FIG. 5 is a flowchart of a method to encode secured message 106 via the ECU transmitter 110 of FIGS. 1 and 2, which may be implemented by the electronic components 400 of FIG. 4. Initially, at block 502, the encryptor 204 receives the payload data 114 from the ECU control circuit 108. At block 504, the encryptor 204 generates the MAC 214 by (i) generating an encrypted value of the payload data 114 and the freshness value 210 stored in memory 404 via an encryption algorithm with the encryption key 212 stored in the secure memory 406, and then (ii) performing a MAC algorithm (e.g., CMAC, GMAC, HMAC, etc.) on the encrypted value. At block 506, the truncator 206 truncates the MAC 214. In some examples, the MAC 214 is truncated to a length of N least significant bits based on the ECU CAN ID of the transmitting ECU 100. At block 508, the truncator 206 truncates the freshness value 210. The freshness value 210 is truncated to a length of F. In some examples F is calculated in accordance with Equation (1) above.

At block 510, the message generator 208 generates the secured message 106 with the payload data 114, the truncated freshness value 216, and the truncated MAC 218. To generate the secured message 106, the message generator 208 (a) combines the truncated freshness value 216 and the truncated MAC 218 into security data 202a and 202b, and (b) places the first portion of the security data 202a into the extended arbitration space 222 with the ECU CAN ID and the second portion of the security data 202b in the data space 224 with the payload data 114. At block 512, the message generator 208 transmits, via the CAN interface 408, the secured message 106.

Figure 6:
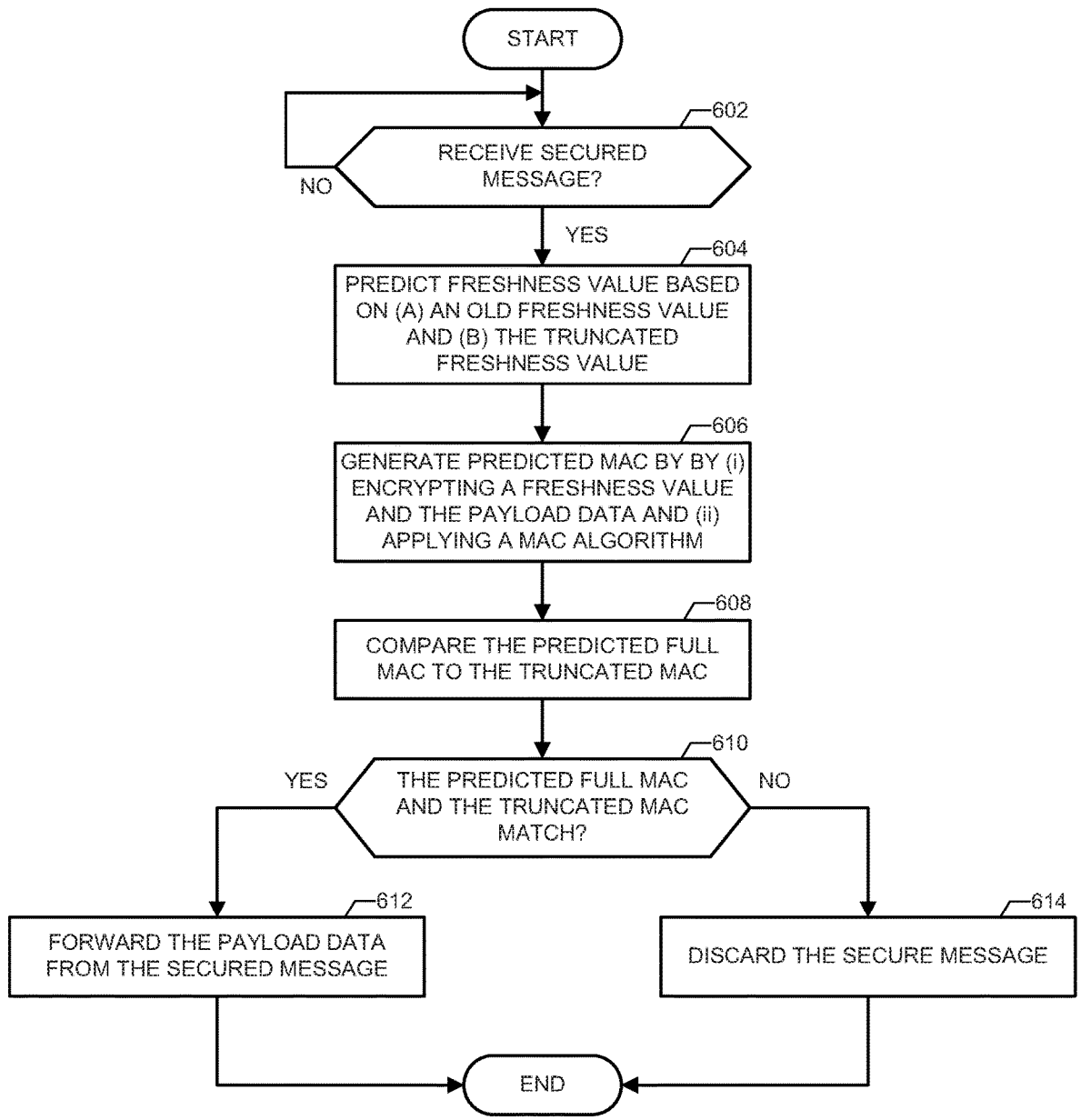
FIG. 6 is a flowchart of a method to authenticate messages via the ECU receiver of FIGS. 1 and 3, which may be implemented by the electronic components of FIG. 4.

FIG. 6 is a flowchart of a method to authenticate secured messages 106 via the ECU receiver 112 of FIGS. 1 and 3, which may be implemented by the electronic components 400 of FIG. 4. Initially, at block 602, the freshness predictor 302 waits until a secured message 106 of interest is detected on the vehicle data bus 104. At block 604, after the secured message 106 of interest is detected, the freshness predictor 302 generates the predicted freshness value 308 based on (a) the old freshness value 310 stored in the memory 404 and (b) the truncated freshness value 216 included in the secured message 106. At block 606, the MAC authenticator 304 generates a predicted MAC value by (i) generating an encrypted value by encrypting the predicted freshness value 308 generated at block 604 and the payload data 114 of the secured message 106, and (ii) applying the MAC algorithm to the encrypted value using the same MAC algorithm used by the ECU transmitter 110.

At block 608, the MAC authenticator 304 compares the predicted MAC generated at block 606 to the truncated MAC 218 included in the secured message 106. To compare the predicted MAC and the truncated MAC, the MAC authenticator 304 truncates the predicted MAC in the same manner as the ECU transmitter 110 truncated the MAC 214. For example, if the ECU transmitter 110 generates the truncated MAC 218 by keeping the 32 least significant bits of the MAC 214, the MAC authenticator 304 truncates the predicted MAC to its 32 least significant bits. In such a manner, the MAC authenticator 304 authenticates the secured message 106 without decrypting any portion of the secured message 106. At block 610, the MAC authenticator 304 determines whether the secured message 106 is authentic based on the comparison of the predicted MAC and the truncated MAC 218. If the truncated predicted MAC matches the truncated MAC 218, the method continues at block 612. Otherwise, if the truncated predicted MAC does not match the truncated MAC 218, the method continues at block 614. At block 612, the MAC authenticator 304 signals that the secured message 106 is authentic and the payload manager 306 forwards the payload data 114 and/or the ECU CAN ID to the ECU control circuit 108. At block 614, the MAC authenticator 304 signals that the secured message 106 is not authentic and the payload manager 306 ignores the secured message 106.

The flowcharts of FIGS. 5 and 6 are representative of machine readable instructions stored in memory (such as the memory 404 of FIG. 4) that comprise one or more programs that, when executed by a processor (such as the processor 402 of FIG. 2), cause the ECU 100 and 102 to implement the example ECU transmitter 110 of FIGS. 1 and 2 and the example ECU receiver 112 of FIGS. 1 and 3. Further, although the example program(s) is/are described with reference to the flowcharts illustrated in FIGS. 5 and 6, many other methods of implementing the example may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a data bus; and
a first control unit including a processor communicatively coupled to the data bus, the first control unit configured to generate a secured message by:
calculating a message authentication code;
truncating the message authentication code;
truncating a freshness value used to generate the message authentication code to a target number of least significant bits, the target number being based on at least one of a criticality value of the first control unit, wherein the criticality value is based on a determined criticality of the first control unit relative to one or more other control units of the vehicle; and
placing portions of the truncated message authentication code and the truncated freshness value in different portions of the secured message.

2. The vehicle of claim 1, wherein the message authentication code is truncated in accordance with a first truncation scheme.

3. The vehicle of claim 2, wherein the freshness value is truncated further based on a length of payload data in the secure message.

4. The vehicle of claim 1, including a second control unit communicatively coupled to the data bus, the second control unit being configured to authenticate the secure message by:
determining a predicted freshness value based on the truncated freshness value in the secured message and a freshness value stored in memory of the second control unit;
generating a predicted message authentication code based on the predicted freshness value;
truncating the predicted message authentication code; and
comparing the truncated predicted message authentication code to the truncated message authentication code in the secured message.

5. The vehicle of claim 4, wherein the predicted message authentication code generated by the second control unit and the message authentication code generated by the first control unit are truncated in accordance with a first truncation scheme.

6. The vehicle of claim 4, wherein the first control unit is further configured to:
determine, based on the comparison of the truncated predicted message authentication code to the truncated message authentication code in the secured message, that the truncated predicted message authentication code does not match the truncated message authentication code in the secured message,
determine, based on based on the determination the truncated predicted message authentication code does not match the truncated message authentication code in the secured message, that the secured message is unauthorized; and
disallow, based on the determination that the secured message is unauthorized, the secure message to proceed to control applications.

7. The vehicle of claim 1, wherein to calculate the message authentication code, the first control unit is further configured to:

encrypt, with an encrypting algorithm using an encryption key stored in secure memory, the freshness value and payload data generated by the first control unit; and apply a message authentication code algorithm to the encrypted freshness value and payload data.

8. The vehicle of claim 7, wherein the encrypting algorithm is an Advanced Encryption Standard algorithm, and the message authentication code algorithm is selected from a group of: cryptographic hashing, Cipher-based Message Authentication Code, Galois Message Authentication Code, and Keyed-hash Message Authentication Code.

9. A method to communicate via a controller area network bus of a vehicle, comprising:

calculating, with a first processor of a first control unit, a message authentication code;

truncating, with the first processor, the message authentication code;

truncating to a target number of least significant bits, with the first processor, a freshness value used to generate the message authentication code, the target number being based on at least one of a criticality value of the first control unit, wherein the criticality value is based on a determined criticality of the first control unit relative to one or more other control units of the vehicle; and placing, with the first processor, portions of the truncated message authentication code and the truncated freshness value in different data fields of a secured message.

10. The method of claim 9, wherein the message authentication code is truncated in accordance with a first truncation scheme.

11. The method of claim 10, wherein the freshness value is truncated further based on a length of payload data in the secure message.

12. The method of claim 9, further comprising:

determining, with a second processor of a second control unit, a predicted freshness value based on the truncated freshness value in the secured message and a freshness value stored in memory of the second control unit;

generating, with the second processor, a predicted message authentication code based on the predicted freshness value;

truncating, with the second processor, the predicted message authentication code; and comparing, with the second processor, the truncated predicted message authentication code to the truncated message authentication code in the secured message.

13. The method of claim 12, wherein the predicted message authentication generated code generated by the second processor and the message authentication code generated by the first processor are truncated in accordance with a first truncation scheme.

14. The method of claim 12, wherein:

determining, based on the comparison of the truncated predicted message authentication code to the truncated message authentication code in the secured message, that the truncated predicted message authentication code does not match the truncated message authentication code in the secured message, determining, based on based on the determination the truncated predicted message authentication code does not match the truncated message authentication code in the secured message, that the secured message is unauthorized; and disallowing, based on the determination that the secured message is unauthorized, the secure message to proceed to control applications.

15. The method of claim 9, wherein calculating the message authentication code further comprises:

encrypting, with the first processor and an encrypting algorithm and an encryption key stored in secure memory of the first control unit, the freshness value and payload data generated by the first control unit; and applying, with the first processor, a message authentication code algorithm to the encrypted freshness value and payload data.

16. The method of claim 15, wherein the encrypting algorithm is an Advanced Encryption Standard algorithm, and the message authentication code algorithm is selected from a group of: cryptographic hashing, Cipher-based Message Authentication Code, Galois Message Authentication Code, and Keyed-hash Message Authentication Code.

17. An electronic control unit (ECU) of a vehicle comprising:

an ECU transmitter configured to generate a secure message by:

calculating a message authentication code;

truncating the message authentication code to a first target number of least significant bits;

truncating a freshness value used to generate the message authentication code to a second target number of least significant bits, the second target number being different than the first target number, wherein the second target number is based a criticality value of the ECU, wherein the criticality value is based on a determined criticality of the ECU relative to one or more other ECUs;

generating security data by combining the truncated message authentication code and the truncated freshness value; and placing portions of the security data in different data fields within the secured message separated by at least one control field.

18. The electronic control unit of claim 17, wherein the second target number is based on a frequency at which the secured message is transmitted.

* * * * *